(No Model.)

C. B. COWEN.
CAR COUPLING.

No. 435,209. Patented Aug. 26, 1890.

Witnesses:
H. E. Harrison
J. A. Herron

Inventor:
Charles B. Cowen
Per O. D. Levis
Atty.

UNITED STATES PATENT OFFICE.

CHARLES B. COWEN, OF PITTSBURG, PENNSYLVANIA.

CAR-COUPLING.

SPECIFICATION forming part of Letters Patent No. 435,209, dated August 26, 1890.

Application filed February 1, 1890. Serial No. 338,944. (No model.)

*To all whom it may concern:*

Be it known that I, CHARLES B. COWEN, a citizen of the United States, residing at Pittsburg, in the county of Allegheny and State of Pennsylvania, have invented certain new and useful Improvements in Car-Couplings; and I do hereby declare the following to be a full, clear, and exact description of the invention, such as will enable others skilled in the art to which it pertains to make and use the same, reference being had to the accompanying drawings, which form a part of this specification.

My invention relates to an improvement in car-couplings; and it consists in a suitably-constructed draw-head having arranged therein on pivots two hooked bars, which are adapted to make an automatic coupling with another car provided with the same or similar coupling, a means for releasing the said coupling, and a means whereby one of the said bars may be moved out of the way, together with certain other details of construction and combination of parts, as will be fully set forth hereinafter.

Figure 1:
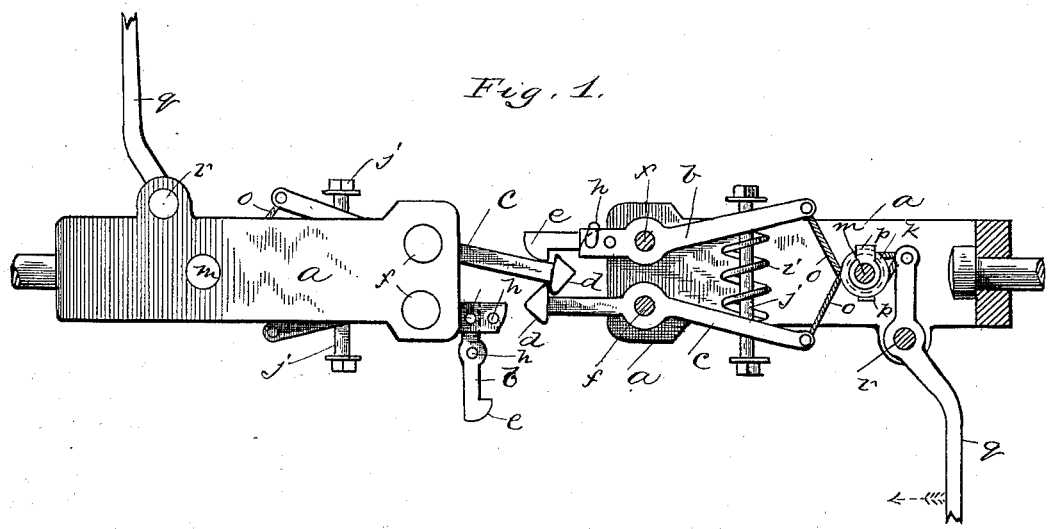
Figure 2:
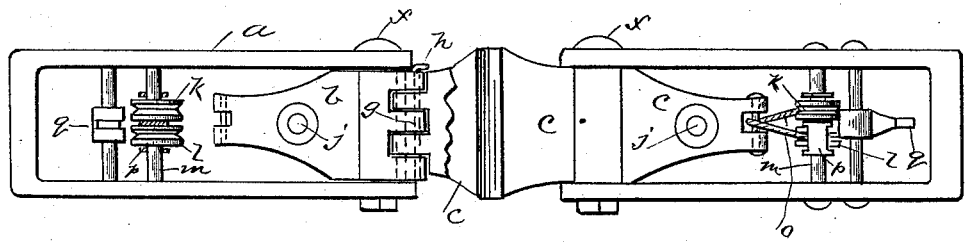

In the accompanying drawings, Figure 1 is a plan view of a pair of my improved couplers, one of which is shown in section, the better to show the working parts. Fig. 2 is a side elevation of the same.

To construct a coupling in accordance with my invention, I provide a draw-head $a$, having an open front, in which I arrange two draw-bars $b\ c$ by means of strong pivots $f$, the one bar $c$ having an arrow-head $d$ and the other a simple hook $e$. This hooked bar $c$ is divided forward of the pivot $f$ and arranged in the form of a hinge $g$, which may be made rigid by inserting a pin $h$ down through the hinge-lugs $g$. At the rear of the pivots $f$ and between the bars $b\ c$ is a strong spiral spring $i$, which compresses or moves the hooked ends of the bars together. A transverse bolt $j$ serves to keep this spring $i$ in position. At the rear of these bars $b\ c$ are arranged two small pulleys $k\ l$, loosely secured to a pin $m$, over which two small chains $o$ pass. One end of each is attached to the rear extremities of the bars $b\ c$ and the other ends to a lever $q$, which extends to a point within reach of the operator. Between these pulleys $k\ l$, I place a small device $p$ to prevent the chains $o$ from leaving the grooves of the same.

In operation one of the hook-bars $b$ is moved outwardly, as shown at Fig. 1 on the drawings. The remaining bar $c$ when moved against the opposite coupling will separate and force an entrance, and cannot be withdrawn until released by a forward movement of the lever $q$, which separates the two bars $b\ c$ and permits the other to move out. It will be seen that with couplings such as described the same will couple automatically with itself, and that high or low placed couplings will operate in a satisfactory manner.

Having thus described my invention, what I claim, and desire to secure by Letters Patent, is—

1. In a car-coupling, the combination of a draw-head, draw-bars pivoted within said draw-head, one of said bars having its forward portion pivoted to the main bar, means for holding said pivoted portion in line with the main portion of the bar, a spring arranged between the draw-bars for normally forcing the forward ends of the draw-bars toward each other, a lever, and connections intermediate of the lever and rear ends of the draw-bars, substantially as and for the purpose described.

2. The herein-described coupling, consisting of the draw-head $a$, having arranged therein two draw-bars $b\ c$, one of which is provided with an arrow-head $d$ and the other provided with a hook $e$, the hinged portion $g$ of the draw-bar $b$, the spring $i$, for closing the front portions of the said draw-bars $b\ c$, the lever $q$, connected to the rear extremities of the draw-bars by suitable means $o$, and the pulleys $k\ l$, substantially as and for the purpose described.

In testimony that I claim the foregoing I hereunto affix my signature this 16th day of December, A. D. 1889.

CHARLES B. COWEN. [L. S.]

In presence of—
M. E. HARRISON,
C. C. LEE.